United States Patent
Caprioli

(10) Patent No.: US 7,890,739 B2
(45) Date of Patent: Feb. 15, 2011

(54) METHOD AND APPARATUS FOR RECOVERING FROM BRANCH MISPREDICTION

(75) Inventor: Paul Caprioli, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 393 days.

(21) Appl. No.: 12/033,626

(22) Filed: Feb. 19, 2008

(65) Prior Publication Data

US 2009/0210683 A1 Aug. 20, 2009

(51) Int. Cl.
G06F 9/42 (2006.01)
(52) U.S. Cl. ..................................................... 712/239
(58) Field of Classification Search ........................ None
See application file for complete search history.

(56) References Cited

U.S. PATENT DOCUMENTS

| | | | | |
|---|---|---|---|---|
| 5,506,976 A * | 4/1996 | Jaggar | ........................ | 712/238 |
| 5,812,839 A * | 9/1998 | Hoyt et al. | .................. | 712/239 |
| 5,848,269 A * | 12/1998 | Hara | .......................... | 712/239 |
| 6,230,261 B1 * | 5/2001 | Henry et al. | ................ | 712/240 |
| 7,152,155 B2 * | 12/2006 | McIlvaine et al. | ........... | 712/239 |
| 7,254,700 B2 * | 8/2007 | Levitan et al. | .............. | 712/239 |
| 2001/0047467 A1 * | 11/2001 | Yeh et al. | ..................... | 712/228 |
| 2005/0114636 A1 * | 5/2005 | McDonald et al. | .......... | 712/238 |
| 2005/0223200 A1 * | 10/2005 | Tremblay et al. | ........... | 712/235 |
| 2006/0095745 A1 * | 5/2006 | Tran | ............................. | 712/238 |
| 2006/0112262 A1 * | 5/2006 | Elwood | ...................... | 712/240 |
| 2006/0149933 A1 * | 7/2006 | Eickemeyer et al. | ........ | 712/219 |
| 2007/0288736 A1 * | 12/2007 | Luick | ......................... | 712/240 |

* cited by examiner

*Primary Examiner*—Eric Coleman
(74) *Attorney, Agent, or Firm*—Park, Vaughn, Fleming & Dowler LLP; Anthony P. Jones

(57) ABSTRACT

Embodiments of the present invention provide a system that executes a branch instruction. When executing the branch instruction, the system obtains a stored prediction of a resolution of the branch instruction and fetches subsequent instructions for execution based on the predicted resolution of the branch instruction. If an actual resolution of the branch instruction is different from the predicted resolution (i.e., if the branch is mispredicted), the system updates the stored prediction of the resolution of the branch instruction to the actual resolution of the branch instruction. The system then re-executes the branch instruction. When re-executing the branch instruction, the system obtains the stored prediction of the resolution of the branch instruction and fetches subsequent instructions for execution based on the predicted resolution of the branch instruction.

21 Claims, 2 Drawing Sheets

METHOD AND APPARATUS FOR RECOVERING FROM BRANCH MISPREDICTION

BACKGROUND

1. Field of the Invention

Embodiments of the present invention relate to techniques for handling branches during execution of a computer program. More specifically, embodiments of the present invention relate to techniques for recovering from a branch misprediction.

2. Related Art

Conditional branch instructions cause a stream of execution to conditionally jump from one location to another location in a computer program. For example, when executing a conditional branch instruction, a processor typically resolves a logical condition (e.g., an "if" condition) to determine if the branch is "taken" or "not taken." If the branch is "not taken," the processor increments a program counter (PC) to a next instruction and continues to fetch instructions following the branch instruction. Otherwise, if the branch is "taken," the processor sets the PC to a "target PC," which specifies a target in the program and begins fetching instructions from the target location. Because branch instructions can cause a disruption in sequential execution of program code, branch instructions require specialized handling by the processor. Two techniques for handling such branch instructions are described below.

Multiple Circuits for Computing the Branch Target

When a processor decodes a conditional branch instruction, the resolution ("taken" or "not taken") of the branch instruction is unknown. Hence, the processor cannot determine whether to fetch subsequent instructions directly following the branch instruction (i.e., using the PC) or from another location (i.e., using the target PC). Consequently, the processor may be forced to stall. In order to avoid such stalls, virtually all modern processors include a branch-prediction unit, which predicts whether the branch is "taken" or "not taken" based on prior resolutions of the branch instruction.

A branch-prediction unit is generally used as follows. Upon decoding a branch instruction, the processor computes the target PC and obtains a predicted resolution of the branch instruction from the branch-prediction unit. Next, while commencing execution of the branch instruction, the processor begins to fetch subsequent instructions based on the predicted resolution.

Upon completing the branch instruction, the processor determines if the actual resolution matches the predicted resolution. If so, the processor continues to fetch instructions along the predicted branch. Otherwise, if the branch is mispredicted, the processor computes the PC for the correct branch, flushes the incorrectly fetched instructions from the pipeline, and uses the computed PC to resume fetching instructions along the correct branch path. Note that because the processor must compute the branch target both while making a branch prediction (early in the pipeline) and upon determining that a branch has been mispredicted (at a later stage in the pipeline), the processor includes two sets of circuits for determining the PC and the target PC (i.e., in the branch-prediction unit and in the branch execution unit).

The Delay Slot

In some systems, at least one instruction directly following a branch instruction is guaranteed to execute. For example, in some SPARC™ systems (defined by SPARC International of Campbell, Calif., USA), a single instruction following the branch instruction (called the "delay slot") is automatically executed. This delay slot was added when pipelines were only a few stages long, and the overhead of managing the delay slot was balanced by the useful work the processor could perform while the fetch unit was redirected to fetch instructions from the target PC. However, as pipelines have grown to include more stages, the benefits of automatically executing an instruction in the delay slot have been negated by the overhead of handling the delay slot.

Further complicating the issue of the delay slot is the "annulling branch" instruction. In some systems, this variant of the branch instruction permits the processor to annul the instruction in the delay slot when a branch is predicted "not taken." In these systems, the instruction in the delay slot proceeds through the pipeline, but is prevented from affecting the architectural state of the processor. However, if a "not taken" prediction proves to be incorrect, the delay slot must be restored. Restoring the delay slot involves determining where the instruction from the delay slot is in the pipeline and enabling the instruction to finish executing. These operations require significant overhead.

Hence, what is needed is a branch mechanism without the above-described problems.

SUMMARY

Embodiments of the present invention provide a system that executes a branch instruction. When executing the branch instruction, the system obtains a stored prediction of a resolution of the branch instruction and fetches subsequent instructions for execution based on the predicted resolution of the branch instruction. If an actual resolution of the branch instruction is different from the predicted resolution (i.e., if the branch is mispredicted), the system updates the stored prediction of the resolution of the branch instruction with the actual resolution of the branch instruction. The system then re-executes the branch instruction. When re-executing the branch instruction, the system obtains the stored prediction of the resolution of the branch instruction and fetches subsequent instructions for execution based on the predicted resolution of the branch instruction.

In some embodiments, when executing the branch instruction, the system saves a program counter (PC) for the branch instruction. When re-executing the branch instruction, the system restores the saved PC for the branch instruction and fetches instructions for execution from the restored PC. Consequently, the branch instruction is a first instruction fetched for execution (i.e., the branch instruction is re-executed).

In some embodiments, the system computes a target program counter (target PC) for the branch instruction in a branch target unit. The system uses the target PC to fetch subsequent instructions for execution when the predicted resolution for the branch instruction is "taken."

In some embodiments, the system increments a PC to a next instruction in program order. The system uses the incremented PC to fetch subsequent instructions for execution when the predicted resolution for the branch instruction is "not taken."

In some embodiments, when obtaining the stored prediction, the system reads the predicted resolution for the branch instruction from an entry for the branch instruction in a branch prediction table.

In some embodiments, when updating the stored prediction, the system records the actual resolution of the branch instruction in the entry for the branch instruction in the branch prediction table.

In some embodiments, when re-executing the branch instruction, the system terminates execution of, or deletes a result from, one or more instructions fetched for execution based on the misprediction of the resolution of the branch instruction.

DETAILED DESCRIPTION

The following description is presented to enable any person skilled in the art to make and use embodiments of the present invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a system that avoids some of the complications associated with existing branch prediction mechanisms. In these embodiments, the system uses a stored branch prediction to predict a resolution for a branch instruction and fetches subsequent instructions for execution based on the prediction. Upon encountering a misprediction, the system updates the stored branch prediction to reflect the actual resolution of the branch. The system then re-fetches and re-executes the branch instruction. During this process, the system uses the updated stored branch prediction to predict a resolution for the re-executed branch instruction and fetches subsequent instructions for execution based on the prediction. Because the prediction for the branch reflects the actual resolution of the branch instruction, the branch instruction is predicted properly and therefore finishes executing.

Because branch instructions are re-executed, there is no need to use existing techniques for handling branch instructions. For example, some embodiments of the present invention do not use a delay slot. In addition, embodiments of the present invention do not re-compute the branch target in the branch unit in the event of a mispredicted branch. By not using the "delay slot" and by not re-computing the branch target in the branch unit, embodiments of the present invention facilitate improved handling of branch instructions. More specifically, because there is no delay slot in some embodiments of the present invention, these embodiments do not require the control mechanism for monitoring the delay slot instruction to ensure that the delay slot instruction can be restored. In addition, these embodiments do not require the second adder circuit in the branch unit for computing a branch target, thereby saving area and power, as well as providing a more simplified design.

Computer System

Figure 1:
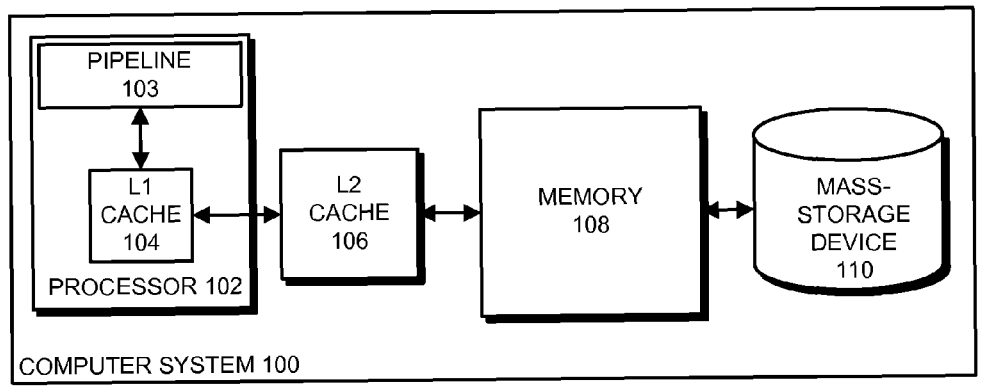
FIG. 1 presents a block diagram of a computer system in accordance with embodiments of the present invention.

FIG. 1 presents a block diagram of a computer system 100 in accordance with embodiments of the present invention. Computer system 100 includes processor 102, L2 cache 106, memory 108, and mass-storage device 110.

Processor 102 is a general-purpose processor that performs computational operations. For example, processor 102 can be a central processing unit (CPU) such as a microprocessor. On the other hand, processor 102 can be a controller or an application-specific integrated circuit. Processor 102 includes pipeline 103. Pipeline 103 is a circuit within processor 102 that executes instructions to perform computational operations. In addition, processor 102 includes L1 cache 104. (In some embodiments of the present invention, L2 cache 106 is also included in processor 102.)

Mass-storage device 110, memory 108, L2 cache 106, and L1 cache 104 collectively form a memory hierarchy that stores data and instructions for processor 102. Generally, mass-storage device 110 is a high-capacity memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well known in the art and are therefore not described in more detail.

Although we use specific components to describe computer system 100, in alternative embodiments different components can be present in computer system 100. For example, computer system 100 can include video cards, network cards, optical drives, and/or other peripheral devices that are coupled to processor 102 using a bus, a network, or another suitable communication channel. In addition, processor 102 may include one or more additional pipelines.

In some embodiments of the present invention, computer system 100 includes one or more additional processors, wherein the processors share some or all of L2 cache 106, memory 108, and mass-storage device 110.

In some embodiments of the present invention, computer system 100 includes fewer levels in the memory hierarchy. For example, in certain memory, power, or space-constrained applications, computer system 100 may only include L1 cache 104 and a small memory 108.

Computer system 100 can be used in many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, an automotive control system, or another electronic device.

Pipeline

Figure 2:
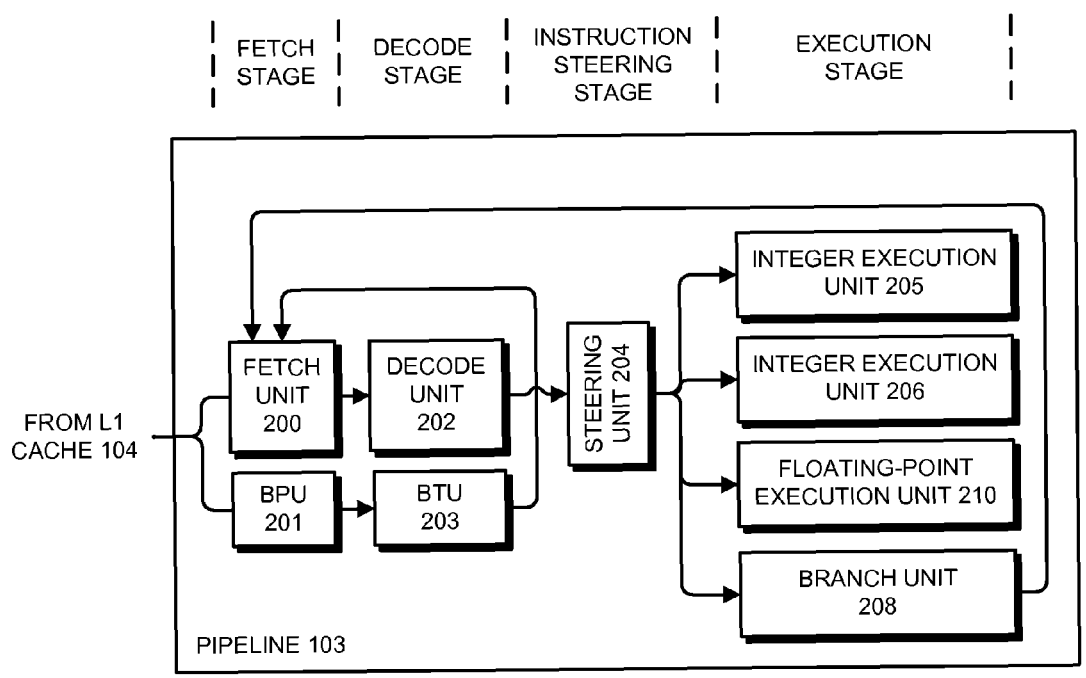
FIG. 2 presents a block diagram that illustrates a simplified pipeline in accordance with embodiments of the present invention.

FIG. 2 presents a block diagram that illustrates a simplified pipeline 103 in accordance with embodiments of the present invention. Pipeline 103 includes several functional units: fetch unit 200, branch-prediction unit (BPU) 201, decode unit 202, branch target unit (BTU) 203, steering unit 204, integer execution units 205-206, branch unit 208, and floating-point execution unit 210. The functional units of pipeline 103 are logically divided into a number of stages according to the operations that the units within the stage perform. These stages include a fetch stage, a decode stage, an instruction steering stage, and an execution stage.

In the fetch stage, the fetch unit fetches instructions and data from L1 cache 104. (Note that some embodiments of the present invention include a separate instruction cache and data cache.) In addition, during the fetch stage BPU 201 predicts the resolution of branches that are encountered in the program code. Generally, BPU 201 determines a "taken" or "not taken" prediction from a branch prediction table that includes listings for a set of branch instructions along with a prediction of the resolution for each branch instruction which is based on one or more prior resolutions of the branch instruction.

In the decode stage, decode unit 202 prepares the fetched instructions for execution in the execution stage. In addition, during the decode stage a branch target (target PC) is calculated for the branch instruction. The target PC is forwarded from BTU 203 to fetch unit 200. If the branch is predicted "taken," fetch unit 200 commences fetching instructions from the target PC. Otherwise, fetch unit 200 continues to fetch instructions following the branch instruction (i.e., fetching instructions from the next increment of the PC).

In some embodiments of the present invention, the target PC is calculated and returned to fetch unit 200 regardless of the prediction for the branch (i.e., the PC is calculated for every branch instruction). However, a control circuit in fetch unit 200 prevents the target PC from being used to fetch subsequent instructions unless the branch is predicted "taken."

In some embodiments of the present invention, during the decode stage BTU 203 signals fetch unit 200 to store the PC for the branch instruction (i.e., the PC from which the branch instruction was fetched) in preparation for recovering from mispredicted branches. In alternative embodiments, BPU 201 signals fetch unit 200 to store the PC of the branch instruction during the fetch stage. In either embodiment, fetch unit 200 stores the PC of the branch instruction in a separate recovery register (or other memory location). Note that fetch unit 200 can include more than one recovery register, thereby allowing fetch unit 200 to simultaneously store a PC for more than one branch instruction.

In the instruction steering stage, steering unit 204 determines the appropriate execution unit for executing each instruction and forwards each instruction to that execution unit. For example, steering unit 204 forwards integer operations to an integer execution unit (e.g., integer execution unit 205), while forwarding branch instructions to branch unit 208.

In the execution stage, the instructions are executed in the appropriate unit. More specifically, integer instructions are executed in integer execution unit 205 or 206, while floating-point instructions are executed in floating-point execution unit 210, and branch instructions are executed in branch unit 208.

During execution of branch instructions, branch unit 208 determines an actual resolution for each branch instruction. If the resolution of the branch instruction was mispredicted in the fetch stage (e.g., the branch was predicted "taken" when the actual resolution is "not taken"), branch unit 208: (1) updates an entry in the branch prediction table for the branch instruction so that the entry indicates the actual resolution of the branch instruction; (2) signals processor 102 to flush pipeline 103 to remove all instructions fetched from along the wrong branch path; and (3) signals fetch unit 200 to restore the PC for the mispredicted branch instruction from the recovery register and commence fetching instructions for execution from the restored PC.

In some embodiments of the present invention, updating the entry for the branch instruction involves updating the entry in the branch prediction table to ensure that the next prediction for the branch instruction accurately reflects the actual resolution of the branch instruction. For example, for a branch predictor that includes a history of more than one prior resolution of the branch (e.g., a multi-bit branch prediction), updating the branch prediction can involve setting the branch prediction to unambiguously indicate that the branch was either "taken" or "not taken."

Fetch unit 200 then commences fetching instructions for execution from the restored PC, which involves first re-fetching the originally-mispredicted branch instruction. Because the branch prediction was updated, the prediction for the branch instruction reflects the actual resolution of the branch instruction. Hence, during the subsequent execution of the branch instruction, the prediction for the branch is correct, meaning that the subsequent instructions are fetched for execution from the proper location in the program code.

Because the branch target is only computed in BTU 203 (instead of being computed in both BTU 203 and in branch unit 208 as in existing designs), the circuitry of branch unit 208 is simpler than in prior art systems.

Note that although we present embodiments of the present invention that use pipeline 103 for the purposes of illustration, pipeline 103 is a simplified version of the execution pipeline which is present in other embodiments of the present invention. In some embodiments, pipeline 103 includes additional stages and/or sub-stages where a wide variety of operations are performed in addition to the basic operations described above. For example, the execution stage can include one or more register read stages, wherein an architectural register file and a working register file are read to provide operands from one or more processor registers.

In some embodiments of the present invention, pipeline 103 includes stages before, in parallel with, and/or after the stages shown in FIG. 2. For example, in these embodiments, pipeline 103 can include an address generation stage and/or a prefetch stage before the fetch stage. In addition, in these embodiments, a memory write stage, cache access stage, and/or trap stage occur within or after the execution stage.

Process for Handling Branch Instructions

Figure 3:
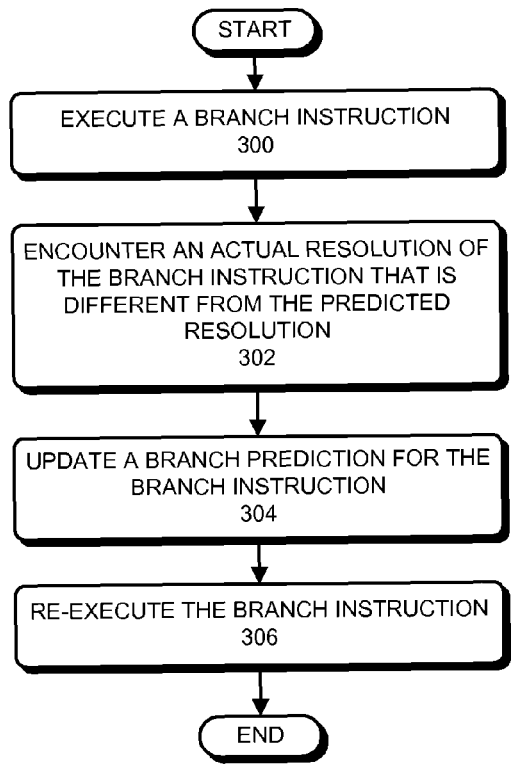
FIG. 3 presents a flowchart illustrating the process for handling branch instructions in accordance with embodiments of the present invention.

FIG. 3 presents a flowchart illustrating the process for handling branch instructions in accordance with embodiments of the present invention. In embodiments of the present invention, the process can be performed by a processor, a computational engine, an application specific integrated circuit (ASIC), or by another device or combination of devices. For clarity we describe embodiments of the present invention wherein the process is performed by a system.

The process starts when the system executes a branch instruction (step 300). When executing the branch instruction, the system determines a target PC for the branch instruction, which is the PC that the system commences fetching instructions from in the event that the branch is "taken." The system also obtains a branch prediction from a branch prediction table. If the branch is predicted "taken," the system uses the target PC to fetch subsequent instructions. Otherwise, if the branch is predicted "not taken," the system fetches instructions following the branch instruction (i.e., from the next instruction as indicated by the present PC). In addition, the system stores the PC of the branch instruction in a recovery register.

The system then encounters an actual resolution of the branch instruction that is different from the predicted resolution (step 302) (i.e., the system encounters a mispredicted branch). In embodiments of the present invention, the actual resolution of branch instructions is not determined until the branch resolution is computed in branch unit 208 (see FIG. 2). Hence, the determination of the branch misprediction occurs several pipeline stages later (in branch unit 208) than where the branch prediction was initially made (in BPU 201).

The system then updates a branch prediction for the branch instruction (step 304). When updating the branch prediction, the system sets the branch prediction to unambiguously indicate the actual "taken" or "not taken" resolution of the branch instruction. In some embodiments, the system updates a branch prediction table entry for the branch instruction to indicate the actual resolution for the branch. In other embodiments, the branch prediction is stored in a different type of memory location and the system updates the memory location to indicate the resolution of the branch.

Next, the system re-executes the branch instruction (step 306). (Re-executing the branch instruction is presented in more detail with respect to FIG. 4.) Because the system updated the branch prediction, the branch is ensured to successfully complete.

Figure 4:
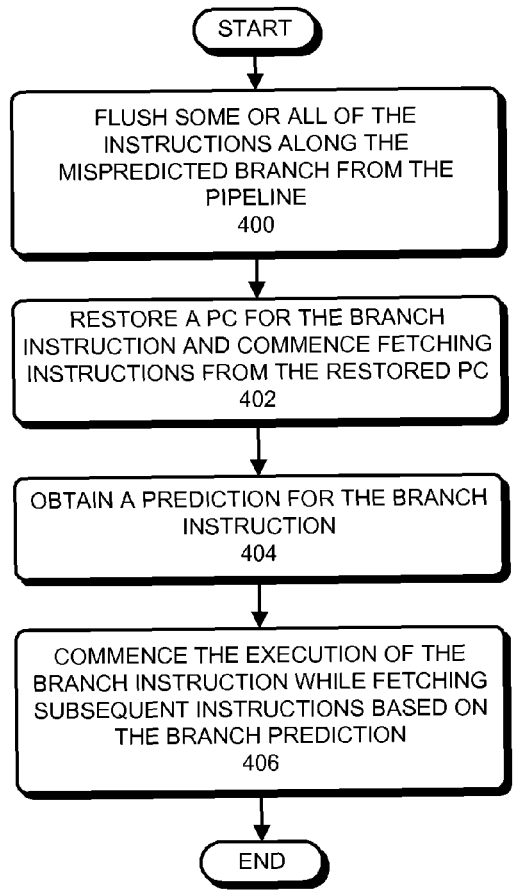
FIG. 4 presents a flowchart illustrating the process for re-executing a branch instruction following a misprediction in accordance with embodiments of the present invention.

FIG. 4 presents a flowchart illustrating the process for re-executing a branch instruction following a misprediction in accordance with embodiments of the present invention. (Note that re-executing the branch instruction is step 306 in FIG. 3.)

When re-executing the branch instruction, the system first "flushes" some or all of the instructions along the mispredicted branch from the pipeline (step 400). Flushing the instructions involves preventing these instructions from completing execution and/or preventing the results of these instructions from affecting the architectural state of the processor.

The system then restores the PC for the branch instruction and commences fetching instructions for execution from the restored PC (step 402). The system restores the PC from the recovery register (see step 300 in FIG. 3). Because the system has restored the PC for the branch instruction, the first instruction that the system fetches is the branch instruction. Hence, the branch instruction is immediately re-fetched (and re-executed).

Upon fetching the branch instruction, the system obtains a branch prediction for the branch instruction (step 404). In some embodiments, the system reads a branch prediction table entry to determine the branch prediction. The system then commences the re-execution of the branch instruction while fetching subsequent instructions based on the branch prediction (step 406). Because the system updated the branch prediction, the branch is ensured to successfully complete.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a branch instruction, comprising:
using a computer to execute the branch instruction, wherein executing the branch instruction involves obtaining a stored prediction of a resolution of the branch instruction and fetching subsequent instructions for execution based on the predicted resolution of the branch instruction;
if an actual resolution of the branch instruction is different from the predicted resolution,
updating the stored prediction of the resolution of the branch instruction to the actual resolution of the branch instruction; and
re-executing the branch instruction, wherein re-executing the branch instruction involves obtaining the updated stored prediction of the resolution of the branch instruction and fetching subsequent instructions for execution based on the updated stored prediction of the branch instruction.

2. The method of claim 1, wherein executing the branch instruction involves saving a program counter (PC) for the branch instruction and wherein re-executing the branch instruction involves restoring the saved PC for the branch instruction and fetching instructions for execution from the restored PC, wherein the branch instruction is a first instruction fetched for execution, whereby the branch instruction is re-executed.

3. The method of claim 1, wherein the method further comprises computing a target program counter (target PC) for the branch instruction in a branch target unit, wherein the target PC is used to fetch subsequent instructions for execution when the predicted resolution for the branch instruction is "taken".

4. The method of claim 3, wherein the method further comprises incrementing a PC to a next instruction in program order, wherein the incremented PC is used to fetch subsequent instructions for execution when the predicted resolution for the branch instruction is "not taken".

5. The method of claim 1, wherein obtaining the stored prediction involves reading the predicted resolution for the branch instruction from an entry for the branch instruction in a branch prediction table.

6. The method of claim 5, wherein updating the stored prediction involves recording the actual resolution of the branch instruction in the entry for the branch instruction in the branch prediction table.

7. The method of claim 1, wherein re-executing the branch instruction involves at least one of, terminating execution of, or deleting a result of, one or more instructions fetched for execution based on a misprediction of the resolution of the branch instruction.

8. An apparatus for executing a branch instruction, comprising:
a processor;
a branch prediction unit on the processor;
a fetch unit on the processor;
wherein during execution of the branch instruction by the processor, the fetch unit fetches subsequent instructions for execution based on a stored prediction of a resolution of the branch instruction provided to the fetch unit by the branch prediction unit;
if an actual resolution of the branch instruction is different from the predicted resolution, the processor
updates the stored prediction of the resolution of the branch instruction to the actual resolution of the branch instruction; and
re-executes the branch instruction, wherein when re-executing the branch instruction, the fetch unit fetches subsequent instructions for execution based on the updated stored prediction for the resolution of the branch instruction provided to the fetch unit by the branch prediction unit.

9. The apparatus of claim 8, wherein when executing the branch instruction, the processor saves a program counter (PC) for the branch instruction and when re-executing the branch instruction, the processor restores the saved PC for the branch instruction and the fetch unit fetches instructions for execution from the restored PC, wherein the branch instruction is a first instruction fetched for execution, whereby the branch instruction is re-executed.

10. The apparatus of claim 8, further comprising a branch target unit on the processor, wherein the branch target unit computes a target PC for the branch instruction and signals the target PC to the fetch unit, wherein the fetch unit uses the target PC to fetch subsequent instructions for execution when the predicted resolution for the branch instruction is "taken".

11. The apparatus of claim 10, wherein the fetch unit increments a PC to a next instruction in program order, wherein the fetch unit uses the incremented PC to fetch subsequent instructions for execution when the predicted resolution for the branch instruction is "not taken".

12. The apparatus of claim 8, wherein when providing the stored prediction, the branch prediction unit reads the predicted resolution for the branch instruction from an entry for the branch instruction stored in a branch prediction table.

13. The apparatus of claim 12, wherein when updating the stored prediction, the processor records the actual resolution of the branch instruction in the entry for the branch instruction in the branch prediction table.

14. The apparatus of claim 8, wherein when re-executing the branch instruction, the processor terminates execution of, or deletes a result of, one or more instructions fetched for execution based on a misprediction of the resolution of the branch instruction.

15. A computer system for executing a branch instruction, comprising:
- a processor;
- a memory coupled to the processor, wherein the memory stores data for the processor;
- a branch prediction unit on the processor;
- a fetch unit on the processor;
- wherein during execution of the branch instruction by the processor, the fetch unit fetches subsequent instructions for execution from the memory based on a stored prediction of a resolution of the branch instruction provided to the fetch unit by the branch prediction unit;
- if an actual resolution of the branch instruction is different from the predicted resolution, the processor updates the stored prediction of the resolution of the branch instruction to the actual resolution of the branch instruction; and
- re-executes the branch instruction, wherein when re-executing the branch instruction, the fetch unit fetches subsequent instructions for execution from the memory based on the updated stored prediction for the resolution of the branch instruction provided to the fetch unit by the branch prediction unit.

16. The computer system of claim 15, wherein when executing the branch instruction, the processor saves a program counter (PC) for the branch instruction and when re-executing the branch instruction, the processor restores the saved PC for the branch instruction and the fetch unit fetches instructions for execution from the restored PC, wherein the branch instruction is a first instruction fetched for execution, whereby the branch instruction is re-executed.

17. The computer system of claim 15, further comprising a branch target unit on the processor, wherein the branch target unit computes a target PC for the branch instruction and signals the target PC to the fetch unit, wherein the fetch unit uses the target PC to fetch subsequent instructions for execution from the memory when the predicted resolution for the branch instruction is "taken".

18. The computer system of claim 17, wherein the fetch unit increments a PC to a next instruction in program order, wherein the fetch unit uses the incremented PC to fetch subsequent instructions for execution from the memory when the predicted resolution for the branch instruction is "not taken".

19. The computer system of claim 15, wherein when providing the stored prediction, the branch prediction unit reads the predicted resolution for the branch instruction from an entry for the branch instruction stored in a branch prediction table.

20. The computer system of claim 19, wherein when updating the stored prediction, the processor records the actual resolution of the branch instruction in the entry for the branch instruction in the branch prediction table.

21. The computer system of claim 15, wherein when re-executing the branch instruction, the processor terminates execution of, or deletes a result of, one or more instructions fetched for execution based on a misprediction of the resolution of the branch instruction.

* * * * *